United States Patent
Schlesener et al.

(10) Patent No.: US 6,970,347 B2
(45) Date of Patent: Nov. 29, 2005

(54) METHOD AND SYSTEM FOR TOOLESS KEYBOARD ASSEMBLY INTO AN INFORMATION HANDLING SYSTEM HOUSING

(75) Inventors: Maria C. Schlesener, Pflugerville, TX (US); Cecilia H. Sun, Austin, TX (US)

(73) Assignee: Dell Products L.P., Round Rock, TX (US)

(*) Notice: Subject to any disclaimer, the term of this patent is extended or adjusted under 35 U.S.C. 154(b) by 182 days.

(21) Appl. No.: 10/647,636

(22) Filed: Aug. 25, 2003

(65) Prior Publication Data

US 2005/0047066 A1 Mar. 3, 2005

(51) Int. Cl.7 ............................................. G06F 1/16
(52) U.S. Cl. ..................... 361/680; 361/683; 345/156; 400/82; 200/5 A
(58) Field of Search ........ 361/680, 683; 345/156–179; 400/82, 693, 492–496; 200/5 A; 248/221.1, 248/221.2, 221.3, 221.4

(56) References Cited

U.S. PATENT DOCUMENTS

| | | | | |
|---|---|---|---|---|
| 4,092,527 A | * | 5/1978 | Luecke | 361/680 |
| 5,510,953 A | * | 4/1996 | Merkel | 361/680 |
| 5,646,820 A | * | 7/1997 | Honda et al. | 361/683 |
| 5,694,124 A | | 12/1997 | Wood | 341/22 |
| 5,697,718 A | | 12/1997 | Erler et al. | 400/714 |
| 5,949,642 A | | 9/1999 | Park | 361/681 |
| 5,966,284 A | * | 10/1999 | Youn et al. | 361/680 |
| 6,064,564 A | * | 5/2000 | Song et al. | 361/680 |
| 6,212,066 B1 | * | 4/2001 | Fetterman | 361/680 |
| 6,320,743 B1 | * | 11/2001 | Jin et al. | 361/680 |
| 6,493,215 B1 | * | 12/2002 | Chiang et al. | 361/680 |
| 6,628,506 B2 | * | 9/2003 | Landry et al. | 361/680 |
| 6,700,773 B1 | * | 3/2004 | Adriaansen et al. | 361/680 |
| 6,751,089 B2 | * | 6/2004 | Hsieh | 361/680 |
| 6,805,505 B2 | * | 10/2004 | Horiuchi et al. | 400/472 |
| 2002/0044408 A1 | * | 4/2002 | DeLuga et al. | 361/680 |
| 2002/0085338 A1 | * | 7/2002 | Lin | 361/680 |
| 2003/0021082 A1 | * | 1/2003 | Lu et al. | 361/683 |
| 2004/0190233 A1 | * | 9/2004 | Yu et al. | 361/680 |

* cited by examiner

*Primary Examiner*—Lisa Lea-Edmonds
(74) *Attorney, Agent, or Firm*—Hamilton & Terrile, LLP; Robert W. Holland

(57) ABSTRACT

Tooless assembly of a keyboard into an information handling system housing is performed by dropping the keyboard into an opening of the housing so that tabs and hooks of the keyboard align with tab slots and hook slots of the housing, by sliding the keyboard relative to the housing to engage the tabs in the tab slots and the hooks in the hook slots, and by securing the keyboard from moving relative to the housing with a tooless keyboard lock. For instance, a portable information handling system having a hinged lid secures the keyboard from sliding by inserting a hinge cover between the keyboard and the housing, the hinge cover having rib structures to keep it in place. Sliding of the keyboard relative to the housing is aided with a pull tab coupled to the keyboard that stores under the hinge cover once assembly is complete.

17 Claims, 3 Drawing Sheets

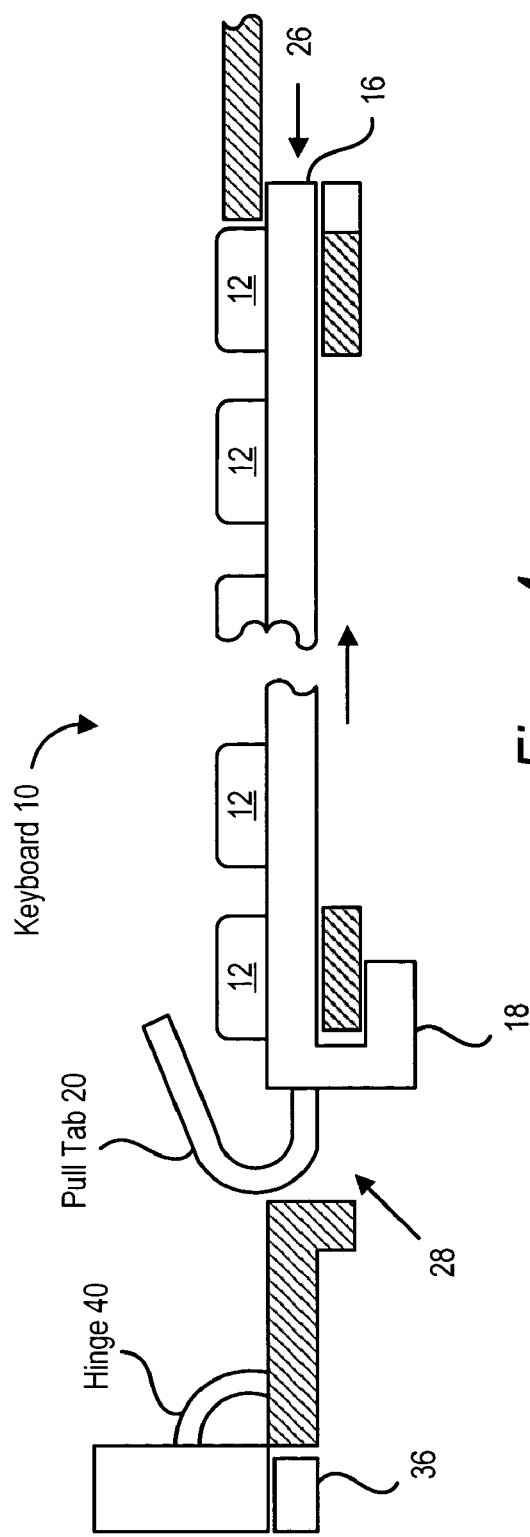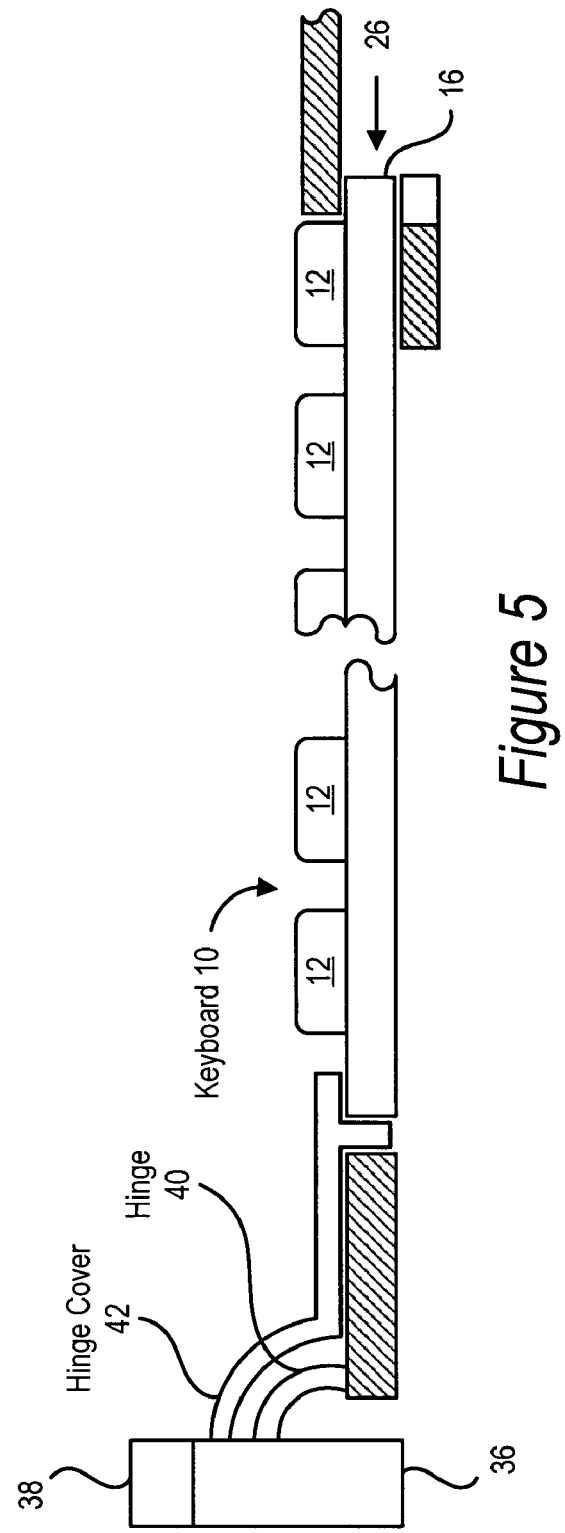

METHOD AND SYSTEM FOR TOOLESS KEYBOARD ASSEMBLY INTO AN INFORMATION HANDLING SYSTEM HOUSING

BACKGROUND OF THE INVENTION

1. Field of the Invention

The present invention relates in general to the field of information handling system manufacture, and more particularly to a method and system for tooless keyboard integration into an information handling system housing.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One feature of information handling systems that has become increasingly important for individuals and businesses is portability. Portable information handling systems generally include all of their components in a compact housing so that users may have mobility while operating a system. A typical portable information handling system has a hinged lid that opens to present a display disposed on the inside of the lid and a keyboard disposed on the housing beneath the lid. Within the housing under and around the keyboard, the information processing components and power supply of the portable information handling system are arranged to fit and operate in a relatively small space. Portable information handling system manufacturers design processing component placement so that space within the housing is used as effectively as possible. The tight placement of components within the housing keeps system size small but makes manufacture and service of portable information handling systems more difficult. For instance, service of a portable information handling system often requires disassembly of the housing and keyboard and manipulation of small and difficult to handle components and fasteners.

Generally, portable information handling system keyboards are secured to the housing with between two and six screws and, perhaps, other components that rest over the keyboard, such as a hinge or hinge cover that couples the lid and display to the housing. Multiple tools are usually used for assembly or disassembly of the portable information handling system, with the lid open and the housing oriented in various directions to permit access to screws that couple the keyboard to the housing. The awkward positioning of the housing increases the difficulty of manufacture and service of portable information handling systems with a greater chance of loose screws or tools causing damage to sensitive electronic components. Further, installation or removal of the keyboard typically requires blind mating and placement of electrical connections between the keyboard and the main board, usually under the keyboard. During assembly or disassembly of the keyboard with the housing, keyboard keys are often popped loose while the technician struggles to align electrical connections and attachment points.

SUMMARY OF THE INVENTION

Therefore a need has arisen for a method and system which assembles a keyboard in an information handling system housing without the use of tools or screws.

A further need exists for a method and system which allows installation of a keyboard in an information handling system housing with one orientation and visual mating of electrical connections.

In accordance with the present invention, a method and system are provided which substantially reduce the disadvantages and problems associated with previous methods and systems for assembly of a keyboard into an information handling system housing. The keyboard couples to the information handling system housing with sliding engagement of tabs into tab slots and hooks into hook slots and locks in place with tooless insertion of locking device between the keyboard and housing that prevents sliding movement of the tabs and hooks from their slots.

More specifically, tabs extend from the keyboard adjacent the lower keys and hooks extend from the keyboard adjacent the upper keys. The information handling system housing has an opening tab slots aligned to accept the tabs and hook slots aligned to accept the hooks. The keyboard is dropped into the opening and slid relative to the housing in the direction from the upper to lower keys so that the tabs engage in the tab slots and the hooks engage in the hook slots. The sliding of the keyboard relative to the housing is aided with a pull tab coupled to the keyboard. The keyboard is locked into place by inserting a cover, such as a hinge cover, in between the keyboard and housing along the edge adjacent to the upper keys. The cover prevents sliding of the keyboard relative to the housing and thus maintains the tabs in the tab slots and the hooks in the hook slots. Ribs formed in the cover or along the edges of the keyboard and housing provide resistance to removal of the cover but allow insertion of the cover in a tooless manner. Removal of the keyboard is accomplished by removing the cover and sliding the keyboard relative to the housing to disengage the tabs from the tab slots and they hooks from the hook slots.

The present invention provides a number of important technical advantages. One example of an important technical advantage is that a keyboard assembles into an information handling system housing with the use of tools or screws. Tooless assembly reduces the risk of damage during assembly by removing screw drivers and screws that could damage electrical components from the assembly process. Tooless assembly also quickens the assembly process and makes assembly and disassembly simpler. Ease of assembly and disassembly aids in the service of information handling system keyboard failures by consumers to reduce warranty repair costs.

Another example of an important technical advantage of the present invention is that installation of a keyboard in an information handling system housing is performed with one orientation and visual mating of electrical connections. The drop and slide assembly does not require awkward position of the information handling system that could lead to it being dropped. Further, visible confirmation of positive electrical connections is performed during assembly by viewing the connection before the cover locking device is installed into place.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 depicts the assembly step of sliding the keyboard to engage tabs and hooks into tab slots and hook slots of the housing; and FIG. 5 depicts the assembly step of securing the keyboard from release by inserting a hinge cover between the keyboard and the housing.

DETAILED DESCRIPTION

A keyboard assembles to integrate with an information handling system housing by sliding engagement of tabs into tab slots and hooks into hook slots to hold the keyboard in the housing. The keyboard is maintained in position with a tooless keyboard locking device that engages the keyboard and information handling system housing to prevent the keyboard from sliding to release the tabs and hooks from the tab slots and hook slots. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
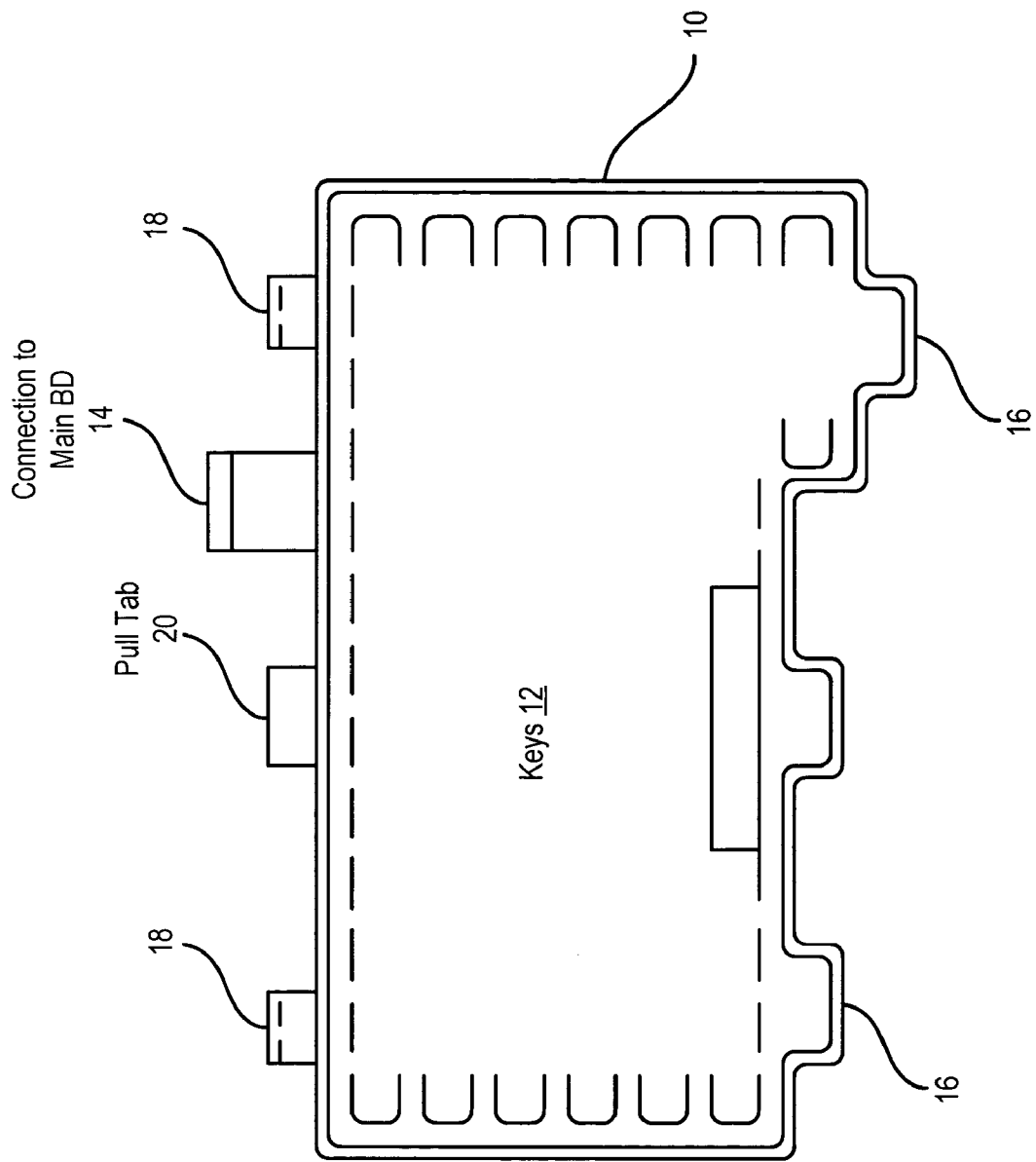
FIG. 1 depicts a top view of an information handling system keyboard for tooless assembly to an information handling system.
Figure 2:
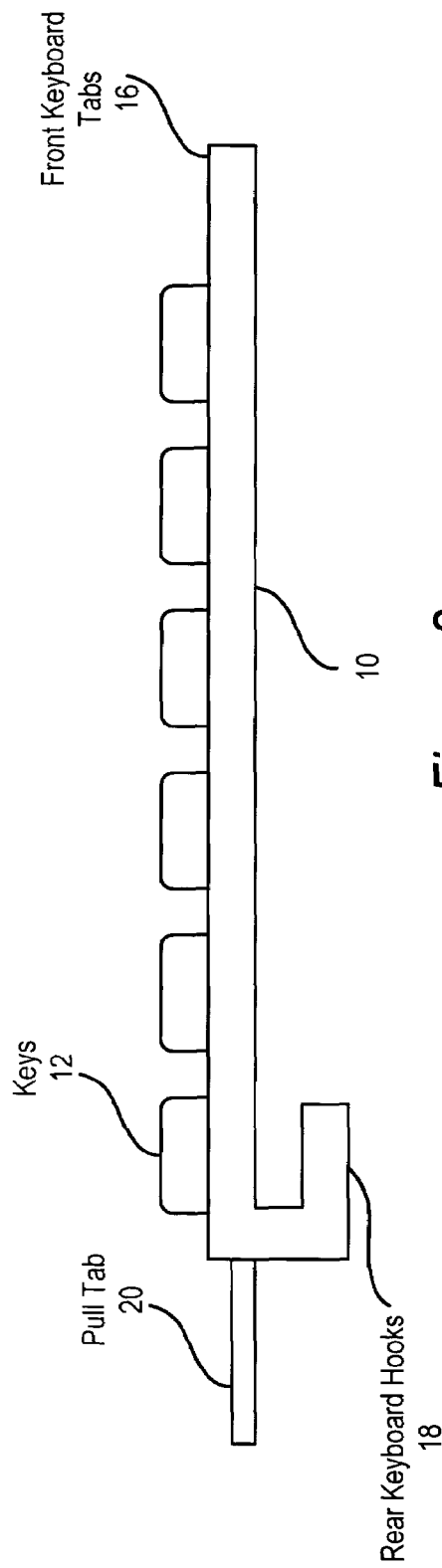
FIG. 2 depicts a side view of the keyboard.

Referring now to FIG. 1, a top view of a keyboard 10 is depicted with the keyboard configured for tooless assembly into an information handling system housing. Keys 12 disposed on the top side of keyboard 10 accept information input by a user of an information handling system and communicate the information to the information handling system as electrical signals through a connector 14. A set of three tabs 16 extend from the side of keyboard 10 adjacent to the lower keys and set of two hooks 18 extend from the opposing side of keyboard 10 adjacent to the upper keys. A pull tab 20 also extending from keyboard 10 adjacent to the upper keys is made of strong flexible material adapted to support a grasp and pull by a technician's hand of the keyboard in a vector from the upper to the lower keys. As is depicted by FIG. 2, tabs 16 extend generally planar to keyboard 10 and are sized to fit into tab slots formed in an information handling system housing. Hooks 18 extend downward from keyboard 10 and then inward to form a hook operable to engage a hook slot of the information handling system housing. Pull tab 20 flexes to extend outward from keyboard 10 for storage after assembly of keyboard 10 into an information handling system.

Figure 3:
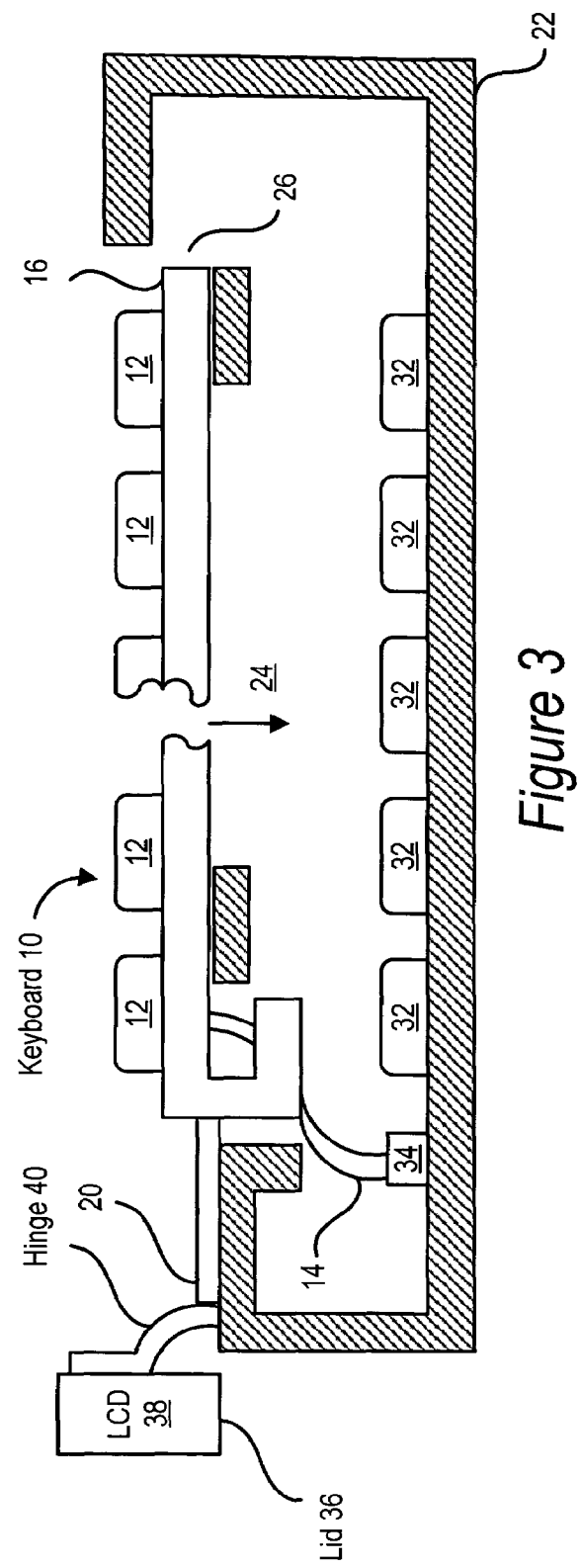
FIG. 3 depicts the assembly step of dropping the keyboard into an opening of an information handling system housing.

Referring now to FIG. 3, the first step of assembling keyboard 10 into information handling system housing 22 is depicted. Keyboard 10 drops into an opening 24 of information handling system 10 so that tabs 16 align with tab slots 26 and hooks 18 align with hook slots 28 formed in information handling system housing 22. Keyboard 10 covers motherboard 30 and information processing components 32, such as the CPU and memory, that are assembled on motherboard 30. Keyboard connector 14 electrically connects keyboard 10 to motherboard 30 through a motherboard connector 34. Information handling system housing 22 has a lid 36 with a display 38 rotationally coupled with a hinge 40 so that the lid closes over keyboard 10. Note that although tabs 16 and hooks 18 are depicted as extending from keyboard 10, in alternative embodiments, so or all of tabs 16 and hooks 18 may be formed as part of housing 22 with tab and hook slots formed in keyboard 10.

Referring now to FIG. 4, the second step of assembling keyboard 10 into information handling system housing 22 is depicted. Pull tab 20 flexes toward keyboard 10 so that a technician may assert a pulling force on keyboard 10 in the direction from the upper keys towards the lower keys. The force applied to pull tab 20 slides keyboard 10 relative to housing 22 so that tabs 16 slide into tab slots 26 and hooks 18 slide into hook slots 28. The engagement of the tabs and hooks in their respective slots holds keyboard 10 in opening 24. With the keyboard engaged in housing 22, an opening is created at hook slot 28 adjacent to the upper keys of keyboard 10 that allows a visible check of electronic components such as the connection between connectors 14 and 34. Removal of keyboard 10 is performed by asserting an opposite pull force on pull tab 20 to slide keyboard 10 relative to housing 22 so that the tabs 16 are removed from tab slots 16 and hooks 18 are released from under hook slot 18.

Referring now to FIG. 5, the completed assembly of keyboard 10 in housing 22 is depicted. Keyboard 10 is locked in place with tooless insertion of a keyboard lock between keyboard 10 and housing 22 in order to prevent a sliding movement of keyboard 10 relative to housing 22 that results in release of the tabs and hooks from their respective slots. In the embodiment depicted by FIG. 5, a hinge cover 42 is inserted in the opening at hook slot 28 created by the sliding movement of keyboard 10 to engage the tabs and hooks. The use of a hinge cover provides the keyboard lock with an existing piece, although in alternative embodiments other types of covers or devices that fit in the space created by the sliding of the keyboard relative to the housing may be used. Hinge cover 42 is sized to restrict movement of keyboard 10 relative to housing 22 so that keyboard 10 cannot slide to release tabs 16 from tab slots 26 and hooks 18 from hook slots 28. Ribs 44 formed on the inserted end of hinge cover 42 engage housing 22 and keyboard 10 to restrict removal of hinge cover 42 from the opening and thus lock keyboard 10 in place. Hinge cover 42 presses between housing 22 and keyboard 10 to overcome the resistance of ribs 44 so that assembly of keyboard 10 is performed in a keyless manner. Pull tab 20 inserts under hinge cover 42 so that it remains hidden after assembly of the information handling system.

Although the present invention has been described in detail, it should be understood that various changes, substitutions and alterations can be made hereto without departing from the spirit and scope of the invention as defined by the appended claims.

What is claimed is:

1. An information handling system comprising:
    a housing having a top having an opening sized to accept a keyboard, the opening having a front and rear, the front having a tab slot and the rear having a hook slot;
    information processing components disposed in the housing and operable to process information;
    a keyboard sized to fit in the housing opening, the keyboard having a front and rear, the front having a tab operable to slidingly engage the tab slot, the rear having a hook operable to slidingly engage the hook slot;
    a keyboard lock operable to fit in the housing opening proximate the keyboard to secure the keyboard from movement in the opening, the keyboard coupled to the housing by the front tab and rear hook; and
    a pull tab coupled to the keyboard and aligned so that pulling on the tab slidingly engages the tab in the tab slot and the hook slot.

2. The information handling system of claim 1, further comprising:
    a lid having a display to display information;
    a hinge rotationally coupling the lid to the housing proximate the rear of the keyboard;
    wherein the keyboard lock comprises a cover operable to fit in the housing opening at the rear of keyboard to cover the hinge.

3. The information handling system of claim 2 wherein the cover comprises ribs aligned to engage the housing and the keyboard to secure the cover between the housing and the keyboard.

4. The information handling system of claim 2 wherein the pull tab aligns under the cover.

5. The information handling system of claim 1 further comprising:
    three tab slots in the front of the housing opening; and
    three tabs coupled to the keyboard front and aligned to engage the tab slots.

6. The information handling system of claim 1 further comprising:
    three hooks slots in the rear of the housing opening; and
    three hooks coupled to the keyboard rear and aligned to engage the hook slots.

7. A method for coupling a keyboard into an information handling system, the method comprising:
    placing the keyboard into an opening of the information handling system housing;
    aligning tabs with tab slots between the keyboard and the housing;
    sliding the keyboard relative to the housing to engage tab slots and the hooks in the hook slots; and
    securing the keyboard relative to the housing to engage the tabs in the tab slots and the hooks in the hook slots by disposing a cover between the keyboard and housing.

8. The method of claim 7 further comprising:
    pressing the cover between the keyboard and housing; and
    engaging ribs of the cover with ribs of the keyboard and housing to removably secure the cover between the keyboard and housing.

9. The method of claim 7 wherein:
    the tabs and hooks are associated with the keyboard; and
    the tab slots and hook slots are associated with the housing.

10. The method of claim 7 wherein:
    the tabs and hooks are associated with the housing; and
    the tab slots and hook slots are associated with the keyboard.

11. A method for coupling a keyboard into an information handling system, the method comprising:
    placing the keyboard into an opening of the information handling system housing;
    aligning tabs with tab slots between the keyboard and the housing;
    aligning hooks with hook slots between the keyboard and the housing;
    securing a pull tab to the keyboard; and
    pulling on the pull tab to slide the keyboard relative to the housing;
    securing the keyboard from sliding relative to the housing to maintain the tabs in the tab slots and the hooks in the hook slots.

12. The method of claim 11 wherein securing the keyboard from sliding further comprises:
    inserting a cover between the keyboard and housing; and
    disposing the pull tab beneath the cover.

13. An information handling system keyboard comprising:
    typing keys disposed on the keyboard for inputting information to an information handling system;
    one or more tabs disposed along one edge of the keyboard, the tabs aligned to slide into tab slots of an information handling system housing;
    one or more hooks disposed along an opposing edge of the keyboard, the hooks aligned to enter hooks slots of the information handling system housing upon alignment of the tabs and tab slots and to engage under the hook slots upon sliding of the tabs into the tab slots; and
    a cover operable to insert between the keyboard and the housing to prevent the keyboard from sliding so that the tabs are maintained in the tab slots and the hooks are maintained in the hook slots.

14. The information handling system keyboard of claim 13 wherein the cover inserts between the keyboard and the housing along the keyboard edge having the hooks.

15. The information handling system keyboard of claim 14 further comprising ribs disposed between the keyboard edge and the cover, the ribs restraining the cover from removal.

16. The information handling system keyboard of claim 14 further comprising a keyboard connector operable to electrically connect the keyboard to a connector associated with the housing, the keyboard connector disposed to be visible between the keyboard and housing after sliding engagement of the tabs and hooks, the cover further operable to cover the keyboard connector upon insertion between the housing and the keyboard.

17. An information handling system keyboard comprising:
- typing keys disposed on the keyboard for inputting information to an information handling system;
- one or more tabs disposed along one edge of the keyboard, the tabs aligned to slide into tab slots of an information handling system housing;
- one or more hooks disposed along an opposing edge of the keyboard, the hooks aligned to enter hooks slots of the information handling system housing upon alignment of the tabs and tab slots and to engage under the hook slots upon sliding of the tabs into the tab slots; and
- a pull tab coupled to the keyboard and operable to accept a pulling force that slides the keyboard relative to the housing.

* * * * *